Nov. 30, 1926. 1,609,046
H. AUSTIN
SPOKED WHEEL OF METAL
Filed Sept. 29, 1924
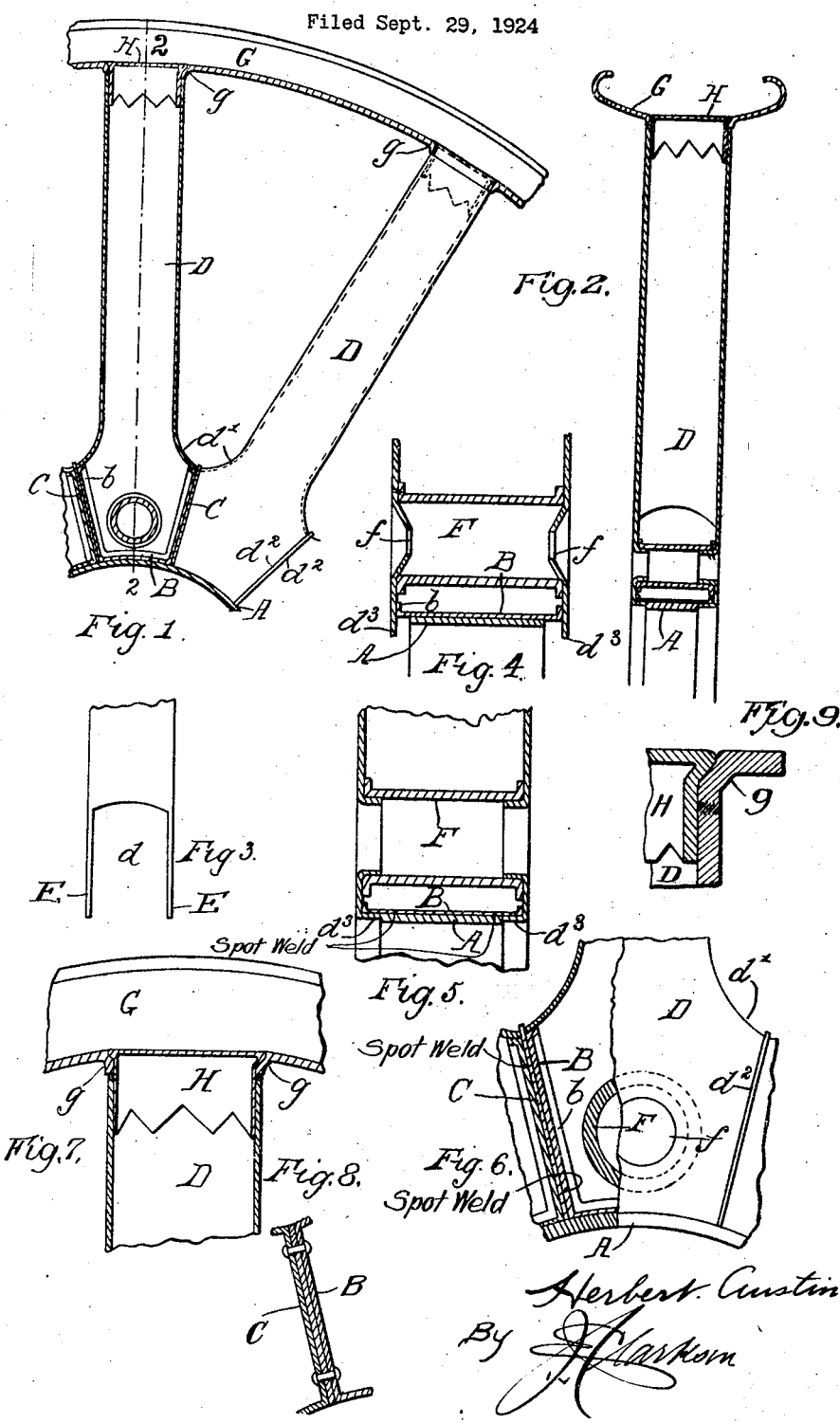

Patented Nov. 30, 1926.

1,609,046

UNITED STATES PATENT OFFICE.

HERBERT AUSTIN, OF BROMSGROVE, ENGLAND.

SPOKED WHEEL OF METAL.

Application filed September 29, 1924, Serial No. 740,585, and in Great Britain June 28, 1924.

This invention relates to spoked wheels built up from sheet metal or sheet metal tubing, or mainly so, and has for its object to provide a light and strong construction which is of an inexpensive character.

According to one feature of the invention the nave of the wheel consists of a metal hoop of substantially the width of the wheel provided with projections extending outwardly, such projections being formed as transverse plates shaped to conform to the usual transverse shape of a wheel nave. The inner end of each spoke is preferably flared out and so shaped as to cover in the space between two projections and fit at its edges over the edges of the plates. Each side edge of each spoke is conveniently arranged to pass over something less than half the thickness of each projection, so that, when two spokes are in position on the nave, a slight space is left between their edges. The extreme inner edges of each spoke are arranged to overlap the sides of the hoop to some extent.

The spokes are secured to the nave by welding around their edges, the slight spaces between the spoke edges serving to receive the metal used in the welding operation.

In lieu of forming the hoop and projections of the nave in one piece, such as by casting, the nave may be formed in sections each consisting of a circumferential portion bent out at its ends to form radial projections. These are secured together to form the nave such as by riveting or spot welding the projections of the one against the faces of the projections of the adjacent sections, but a metal plate may be interposed between each pair of projections if desired.

The spokes may be formed from tubing or from sheet metal bent to tubular form or in halves longitudinally, the joint or joints being afterwards welded up if desired.

According to another feature of the invention, the outer ends of the spokes are butted up to the inner ends of the sockets formed on the inner periphery of the rim. This may be effected by punching suitable holes in the rim and pressing in the edges of the holes to form the sockets. Metal ferrules preferably with closed outer ends are pressed into the sockets and extend a short distance into the outer ends of the spokes. The spokes are then secured at their outer ends to the sockets and to the ferrules by welding, the welding metal entering the crevices between such outer ends and the inner ends of the sockets, and joining them up to the respective ferrules.

In order that the invention may be clearly understood, a convenient application thereof is described with reference to the drawings herewith, in which:—

Figure 1 is a side view partly in elevation and partly in section of a portion of a wheel constructed in accordance with this invention.

Figure 2 is a transverse section taken in the plane indicated by the line 2, 2, of Figure 1.

Figure 3 is a view in elevation of the inner end of a spoke as seen from the mid plane of the wheel.

Figures 4 and 5 are enlarged sectional views to illustrate details of construction and the manner of assembling the spokes and nave or hub.

Figure 6 is a part sectional elevation of the inner end of one of the spokes and part of an adjoining spoke; and, Figure 7 is an enlarged view of the outer end of one of the spokes and a part of the rim as shown in Figure 1.

Figure 8 is a view showing a modified connection of certain parts shown in Figure 6.

Figure 9 is a greatly enlarged section showing a portion of Figure 7 to illustrate the welding.

In these drawings:—A is a metal hoop forming the inner periphery of the nave. B are U-shaped sections of sheet metal of which the base is curved to fit over the hoop A and the sides bent up therefrom in planes radial to the wheel centre. The edges of the metal are flanged up as shown at $b$ (see especially Figure 6). These sections are placed around the hoop the side of the one against a side of the adjacent section except for a metal plate C placed between each of two sections. The sections may be secured to the plates C and to the hoop A by spot welding. The plates C and the sides of the section B are of arch shape at their outer edges to conform to the usual shape of a wheel nave in cross-section and the open sides of the inner ends of the spokes are correspondingly shaped. Each of the plates C is arranged to extend outwards somewhat beyond the open edges of the adjacent spokes so as to locate the spokes during assembly and provide the metal for the welding.

The spokes D of the wheel may be formed from drawn tubes or from sheet metal bent to tubular form or from halves welded or otherwise secured together in a manner already well understood. The inner end of each spoke is cut away at each side as shown at $d$ in Figure 3, and flared out as shown at $d'$ in Figures 1 and 6 in such a manner that when the spokes are placed with their inner ends together their edges $d^2$ conform to the shape of the sides $b$ of the sections B and to the plates C, while the front and back portions are arranged to project inwards past the hoop A as clearly shown at $d^3$ in Figure 4.

Ferrules F are placed between the front and back portions of the inner ends of the spokes (or some of them) concentric with holes $f$, and the ferrules are temporarily secured in approximately their correct positions, during the construction of the wheel, by slightly pressing in the metal surrounding the holes $f$ as clearly shown in Figure 4.

The rim G of the wheel (see especially Figure 7) is drilled or punched at positions where the outer ends of the spokes are to be joined thereto, and the edges of the holes are pressed inwards to form short sockets $g$ against which the outer ends of the spokes are butted up; but a slight space is left between the sockets and the spokes. Closed ended ferrules H are pressed into the sockets and extend a short distance into the spoke ends.

When the wheel is completely assembled the ferrules F are secured by pressing in the metal surrounding the holes $f$ to the form shown in Figure 5, and the portions $d^3$ of the inner ends of the spokes are pressed in under the hoop A when they extend up to the side edges of the hoop.

The wheel when assembled, is welded up by autogenous or electric welding, the welding being run around the edges of the plates C and securing them to such edges and to the sections B. The metal is also run into the spaces between the outer ends of the spokes and the inner edges of the sockets $g$, thus securing the spokes to the sockets and to the ferrules H. The latter may be welded to the rim if desired. Also the inner edges of the spokes may be welded to the side edges of the hoop A. In this manner the wheel may be made entirely waterproof.

A wheel constructed as above described is of very great strength for its weight, and all the joints in the metal are hidden by the metal used in welding. The closed outer ends of the ferrules H of the rim serve to close the holes therein and provide a smooth surface for the tyre to bear against.

Having fully described my invention, what I claim and desire to secure by Letters Patent is:—

1. A spoked wheel comprising a nave, a metal hoop forming a periphery of the nave, radial transverse plates extending outwardly from the hoop, spokes having their inner ends cut out at each side so as to fit at the edges so formed over the said plates, and having their inner ends overlapping the lateral edges of the hoop of the nave and their edges engaging the side edges of the radial plates, such spokes being secured together and to the said plates by welding along said edges.

2. A spoked wheel comprising a nave, a metal hoop, forming a periphery of the nave, U-shaped sections with their bases laid upon the hoop and their sides extending radially outward therefrom, a side of each section being laid close to the adjacent side of the next section and radial transverse plates placed between the sides of the sections so as to form therewith composite radial plates, and spokes having their inner ends cut out at each side so as to fit, at the edges so formed, over the said plates and such spokes secured together and to the said plates by welding along such edges.

3. A spoked wheel comprising a nave, a metal hoop forming a periphery of the nave, U-shaped sections of a width greater than the metal hoop and having their bases laid upon the hoop and their sides extending radially outward therefrom, a side of each section being laid close to the adjacent side of the next section to form composite radial plates, spokes having their inner ends cut out at each side so as to fit, at the edges so formed, over the said plates and being connected thereto by welding along such edges, and the inner edges of the spokes bent in under the U-shaped sections and butted up to the side edges of the hoop.

4. A spoked wheel comprising a nave, a metal hoop forming a periphery of the nave, U-shaped sections with their bases laid upon the hoop and their sides extending outwardly therefrom, a side of each section being laid close to the adjacent side of the next section and radial transverse plates placed between the side of the sections so as to form composite radial plates, and spokes having their inner ends cut out at each side so as to fit, at the edges so formed, over the said plates and such spokes secured together and to the said plates by welding along such edges, the said transverse plates being slightly greater than the sides of the U-shaped sections, so as to locate the spokes during assembly and afford metal for the welding operation.

HERBERT AUSTIN.